United States Patent [19]

Schmitz et al.

[11] Patent Number: 5,538,274
[45] Date of Patent: Jul. 23, 1996

[54] MODULAR INDEPENDENT COIL SPRING SUSPENSION

[75] Inventors: Geoffrey W. Schmitz, Wausau; Brian K. Anderson; David W. Archer, both of Oshkosh, all of Wis.; Daniel J. Schmidt, Lavonia, Mich.

[73] Assignee: Oshkosh Truck Corporation, Oshkosh, Wis.

[21] Appl. No.: 421,995

[22] Filed: Apr. 14, 1995

Related U.S. Application Data

[63] Continuation of Ser. No. 46,623, Apr. 14, 1993, abandoned.

[51] Int. Cl.[6] .............................. B60G 3/20; B60G 7/00; B60G 11/14
[52] U.S. Cl. ..................... 280/666; 280/673; 280/674; 280/696; 280/701; 267/141.2
[58] Field of Search ...................... 280/673, 674, 280/663, 666, 670, 696, 701, 724, 690, 691; 267/141.2, 141.3, 279, 281

[56] References Cited

U.S. PATENT DOCUMENTS

| | | | |
|---|---|---|---|
| 2,278,303 | 3/1942 | Blaser | 280/701 |
| 3,572,677 | 3/1971 | Damon | 267/281 |
| 3,630,303 | 12/1971 | Froumajou | 280/666 |
| 3,856,323 | 12/1974 | Arning et al. | 280/724 |
| 4,057,120 | 11/1977 | Roethlisberger | 280/701 |
| 4,826,203 | 5/1989 | Kijima et al. | 280/701 |
| 4,848,789 | 7/1989 | Timoney et al. | 280/701 |

FOREIGN PATENT DOCUMENTS

| | | | |
|---|---|---|---|
| 1020671 | 2/1966 | United Kingdom | 280/674 |

*Primary Examiner*—Eric D. Culbreth
*Assistant Examiner*—Peter C. English
*Attorney, Agent, or Firm*—Baker & McKenzie

[57] ABSTRACT

A modular independent coil spring suspension for steerable/non-steerable wheel assemblies and driven/non-driven axles having a single coil spring with a low spring rate secured (a) to the lower of two vertically spaced control arms which connect the chassis to the wheel assembly on one end, and (b) to the chassis at an upper location approximately level with a tire of the wheel assembly at the other end which provides maximum wheel travel, decreased rearward thrust, and tire/ground mobility.

13 Claims, 4 Drawing Sheets

MODULAR INDEPENDENT COIL SPRING SUSPENSION

This application is a continuation of U.S. patent application Ser. No. 08/046,623 filed Apr. 14, 1993, now abandoned.

This invention relates generally to independent suspensions particularly useful in off-highway applications and specifically to an independent suspension which is modular, in that it can be used in steering or non-steering configurations and with both driven and non-driven axles. More specifically, the suspension is characterized by a low spring rate, long wheel travel, high ground clearance and flexible frame adaptability.

BACKGROUND OF THE INVENTION

In order to appreciate the uniqueness of the instant invention several terms used herein require definition.

A high speed surface is defined as terrain which has no obstacles with height that exceeds wheel travel.

A low spring rate means that a wheel is allowed to travel or be displaced upwardly to accommodate a sudden change in terrain with minimal change in vertical force. Since the change in vertical force is what causes vertical body motion, a low spring rate suspension system allows a vehicle to travel such terrain with very little input to chassis and driver. A further advantage of a low spring rate is a decrease in the rearward thrust that is generated as the wheel encounters a positive bump. This "give" or "easing" of the rearward thrust not only reduces driver fatigue but it decreases the power necessary to traverse rough terrain. A low spring rate also decreases the forward thrust required to propel a given wheel up the leading edge of a low-speed obstacle, thereby reducing the tractive effort required. Since less traction is required, the modular independent suspension can negotiate low-speed obstacles with steeper leading edges and under more slippery conditions.

Long wheel travel refers to the vertical motion of a wheel during travel and refers specifically to the extension of the extremes of terrains which are classified as "rough", thereby increasing the variety of surfaces which the modular independent suspension can cross at high speeds. An increase in long wheel travel also increases the height of obstacles which can be negotiated with all tires in contact with the ground. Maintenance of tire-ground contact increases mobility and combats vehicle roll-over.

A low-speed surface is terrain made up of obstacles with heights that exceed wheel travel.

High ground clearance refers to the height of an obstacle that can pass between the tires of a given axle.

A flexible frame refers to the basic structural framework of the vehicle and connotes the ability of the frame to torsionally deflect during operation. The existence of a flexible frame, in effect, increases the effective wheel travel while negotiating low-speed obstacles.

As the road system deteriorates in most Western nations and as the demand for efficient low cost off highway vehicles increases, the use of independent suspensions on off vehicles is of greater and greater importance. Although many independent suspension systems have been developed and gone into use, none appear to be entirely satisfactory for a wide range of operating environments. For example, few, if any, independent suspension systems are truly modular in the sense that they can be applied to steerable or non-steerable wheels, and driven or non-driven axles. Further, the current trend is to design stronger and more rigid frame structures to meet increasingly severe operating conditions and, experience has shown, this is technically questionable in many applications. And in few if any systems is there any significant degree of commonality of components from wheel to wheel. This latter feature is of increasing significance because unique constructions, wheel to wheel, increase initial cost, maintenance costs, inventory stocking, and skill levels required to keep fleets of heavy duty vehicles operating at high efficiency. Further, in many present independent suspensions operator fatigue is a serious concern. In many systems the wheel travel is so low that the operator is constantly applying and releasing the throttle and yet, even with frequent speed changes, the vertical forces imparted to the operator's cab is frequent during an eight-hour shift.

SUMMARY OF THE INVENTION

The present invention includes a modular independent suspension which can be applied to steering or non-steering configurations for both driven and non-driven axles. Two such suspension modules, identical except for being the mirror image of the other, create the right and left suspensions for a given axle position.

In addition, the modules make available unusually long wheel travel. This derives, in part, from the use of articulated control arms and a flexible frame. Indeed, whereas one well-known suspension system has about 14 ½ inches of wheel travel, the module of the present invention makes available about 18 inches, an increase of approximately 25 percent, and, when coupled with a flexible frame, re-defines the high-speed surface for which the vehicle is adapted up to about 23 inches, approximately a 60 percent increase.

Simultaneously with the above-described long wheel travel the modular independent suspension of this invention provides a low spring rate which accommodates sudden changes in terrain with minimal change in vertical force resulting in less impact to the chassis and the driver, a decrease in rearward thrust as the wheels encounter a positive bump, a decrease in the traction effort required and an increase in the ability to negotiate low-speed obstacles with steeper leading edges and under more slippery conditions more efficiently, all as contrasted to current commercial designs.

A suspension module consists of an upper and lower suspension arm, a wheelend carrier/steering knuckle and steering arm assembly, sealed upper and lower ball joints, a tie rod, and a coil spring assembly. If desired, one or more of an auxiliary shock absorber, an anti-sway bar, a bump stop assembly (which functions as a supplemental spring) and a rebound stop assembly may be optionally, but preferably, employed.

Other features will be obvious from the following description of a specific embodiment.

BRIEF DESCRIPTION OF THE DRAWING

The invention is illustrated more or less diagrammatically in the accompanying drawing in which:

FIG. 6 is a section through one of the four inboard control arm pivots of the suspension illustrating particularly the sliding bearing which joins the control arms to the control arm mounting assembly; and FIG. 7 is a section through the unique lower steering knuckle ball joint at the outer end of a lower control arm.

DESCRIPTION OF A SPECIFIC EMBODIMENT

Figure 1:
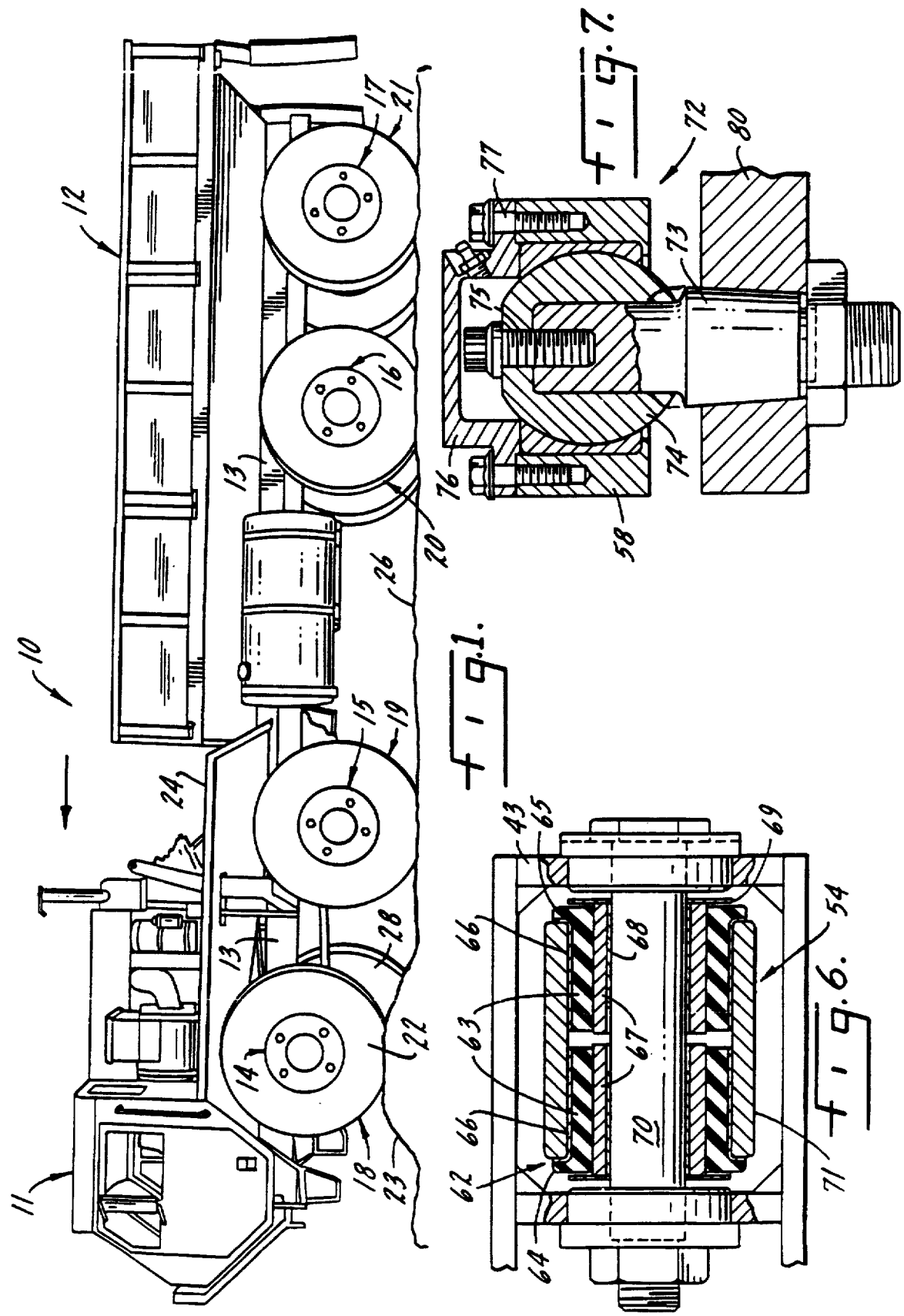
FIG. 1 is a side perspective of an off-highway vehicle having the modular independent suspension of this invention and illustrating the traverse of an obstacle by one wheel of a four-axle vehicle.

Like reference numerals will be used to refer to like or similar parts from Figure to Figure in the following detailed description of the drawing.

An off-highway vehicle is indicated generally at 10 in FIG. 1, the vehicle being, in this instance, a hauler having a cab, indicated generally at 11, and a bin, indicated generally at 12. The cab and bin are mounted on a flexible frame of which the left longitudinal main frame member is indicated at 13. The vehicle has, in this instance, four axles indicated generally at 14, 15, 16 and 17, each having mounted thereon, in this instance, a single tire wheel assembly 18, 19, 20 and 21 respectively on the left side of the frame. The frame is a flexible frame in the sense that the cab and bin are separate structures and can move with respect to one another during travel as a result of the application of torsional forces to the frame. Although a hauler has been illustrated, it will be understood that the invention is applicable to any off-highway vehicle, such as construction equipment, and, also, military vehicles such as tank haulers.

In FIG. 1 the hauler is shown moving to the left in the direction of the arrow. The left front tire 22 has encountered an obstacle in its path of travel and consequently the entire wheel assembly 18 has been elevated until the top of the tire is only a few inches below the overlying platform 24 on which the engine is mounted. Yet, at the same instant, left second axle wheel assembly 19 has remained on the level terrain 26, as have the third and fourth wheel assemblies 20 and 21. It should be particularly noted that the driver's cab 11 has been displaced upwardly very little, if at all, from its normal level terrain position even though left tire assembly 18 has been displaced upwardly at least about 1 ½ feet. The independent suspension aspect of the front axle assembly can be further appreciated from the fact that the right front tire 28 remains on level terrain even though left front wheel assembly 18 is elevated.

Figure 2:
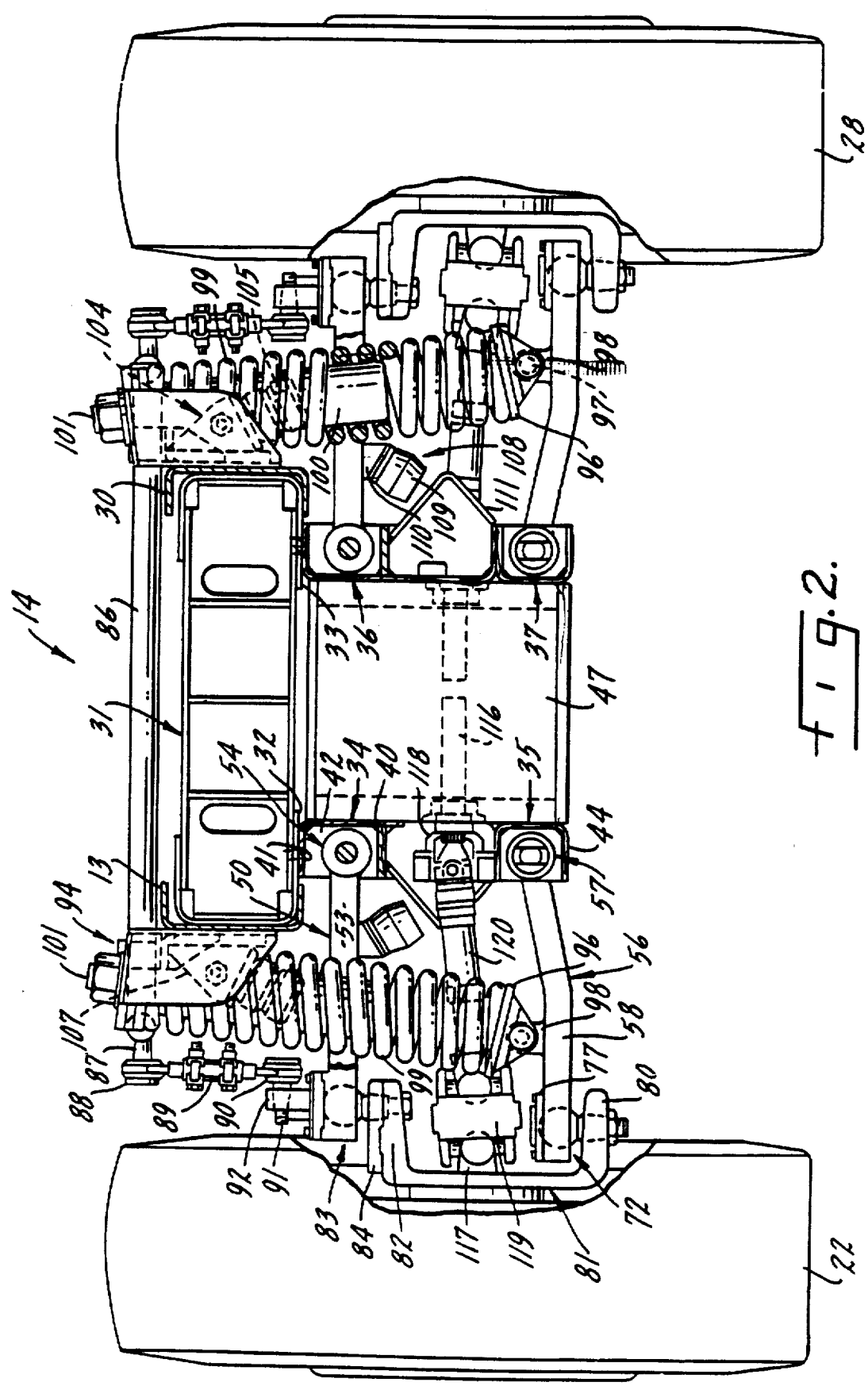
FIG. 2 is a rear elevation of the modular independent suspension of this invention with parts broken away and others omitted for clarity.

FIG. 2 illustrates any one of axles 14–17 on a level plane. For convenience, it will be understood that axle 14, which includes left and right front tires 22 and 28, is shown.

The main frame members are indicated at 13 and 30. A cross member assembly is indicated generally at 31, the construction of the cross member not being especially critical as long as it includes means, here inwardly directed flanges 32, 33, which provide a base for securement of the independent suspension assembly to the frame.

The independent suspension assembly includes a left upper control arm mounting assembly 34, a left lower control arm mounting assembly 35, a right upper control arm mounting assembly 36 and a right lower control arm mounting assembly 37. Since the arrangement of the control arm mounting assemblies is identical except being minor images of one another from side to side on the chassis, only the left one will be described.

Figure 5:
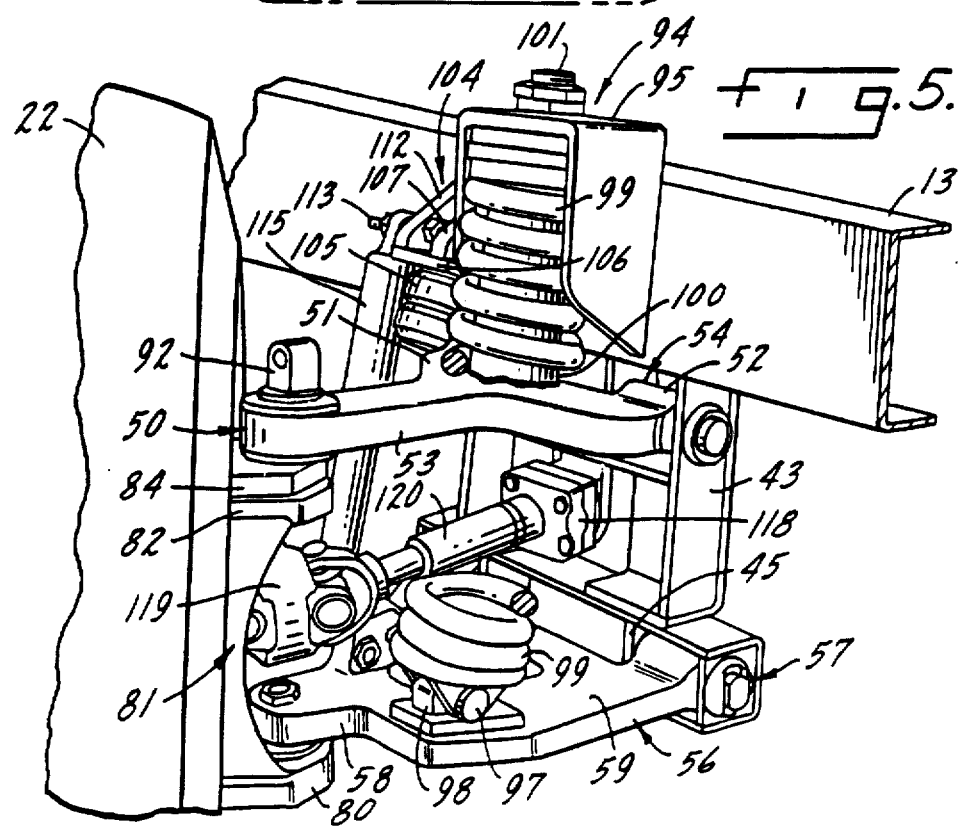
FIG. 5 is a perspective view of the independent modular suspension assembly of this invention with parts broken away and others omitted for clarity, the wheel assembly being in a steering mode.

Left control arm mounting assembly 34 includes a frame which comprises an L-shaped bracket 40 whose upper arm 41 is secured to flange 32 of the cross member 31. A pair of vertical braces, one of which is illustrated at 42 and another of which is illustrated at 43 in FIG. 5, provide anchor plates for the removable components of the upper control arm assembly to be described. In similar fashion, a lower bracket 44 is rigidly spaced below the upper bracket 40, and one of several vertical braces is indicated at 45, the latter braces providing anchor posts for the lower control arm mounting assembly 35. The left and right control arm mounting assemblies are thus integral with the cross member 31 and thus the frame members 13 and 30.

A differential assembly is indicated at 47, the differential assembly being secured to the left and right control arm mounting assemblies, but not to the cross member 31. Thus, in order to repair or replace the differential assembly it is only necessary to release the securement means holding the differential assembly to the control arm mounting assemblies and the differential assembly may be dropped downwardly following.

The left upper control arm, indicated generally at 50, is illustrated best in FIGS. 2 and 5. It is generally Y-shaped and includes front arm 51, see FIG. 5, rear arm 52, and stem 53. Each of arms 51 and 52 terminates in a control arm pivot indicated generally at 54, see also FIG. 6, which receives a bushing assembly, described hereinafter. The outer end of stem 53 receives a unique two-piece ball joint to be described hereinafter.

Left lower control arm 56 is articulated, as best seen in FIG. 2, and also terminates at its inner end in a pair of control arm pivots, the rearward one of which is indicated generally at 57. The outer end of control arm 56 terminates in a projection 58 which is connected to a ball joint. A wide plate area is indicated at 59, see FIG. 5, between the projection 58 and the control arm pivots on the inner ends of the control arm.

The construction of the control arm pivots can be best visualized from FIGS. 5 and 6 which illustrate that each of the upper and lower control arms is secured to the chassis by means of two co-linear pivot pins that allow the control arms 50, 56 to move in generally vertical directions. Bushings isolate the pins from the arms thusly allowing confirmation to road shock and enabling the system to absorb high-frequency road inputs.

The control arm pivot 54 includes a bushing 62, see FIG. 6, which consists of a pair of aligned hollow rubber cylinders 63 having end flanges 64, 65 respectively. A metal sleeve 66 is received in the depression formed in the outer circumference of each of cylinders 63, the rubber cylinders 63 being bonded to the metal sleeve 66 so that metal-to-metal contact occurs between the bushing socket 71 and the exterior surface of the bushing. A cylindrical steel sleeve 67 is bonded concentrically to the inside surface of each of rubber cylinders 63. A thin walled cylindrical liner 68 is inserted into the open end of each of the inner steel sleeves 67. A thrust washer assembly is indicated generally at 69 at each end of the bushing assembly. Preferably the thrust washer assembly includes (a) a plastic ring which contacts the outer ends of the cylindrical steel sleeves 67 and the rubber cylinders 63, and (b) a stainless steel washer. Preferably the thrust washer assembly, and specifically the plastic ring, is made from a synthetic lubricant impregnated material. The cylindrical portion of the liner formed by steel sleeves 67 provides an anti-friction medium between the bushing's inner diameter and the steel pin 70 that locates the bushing to the chassis. The thrust washer assembly provides an anti-friction medium between the bushing and the means on the chassis that encapsulates it, thereby preventing fore and aft motion. A means for lubricant to be injected into the inner diameter of the bushing can be incorporated to prolong the life of the anti-friction feature.

Fore-aft tolerance of the control arms along the pivot pins is adjusted by U-shaped shims inserted fore and/or aft of the bushing at each pivot point as needed in the space provided. The retaining feature of the shims requires them to be used in pairs at a given point. After the shim pair is installed they are rotated in opposite directions until holes, pre-made in the base of the U of each shim, line up. Fasteners are then installed through the holes and tightened preventing the shims from rotating relative to each other. In this position the legs of one shim's U cross those of the other, retaining them jointly around the pin.

Figure 3:
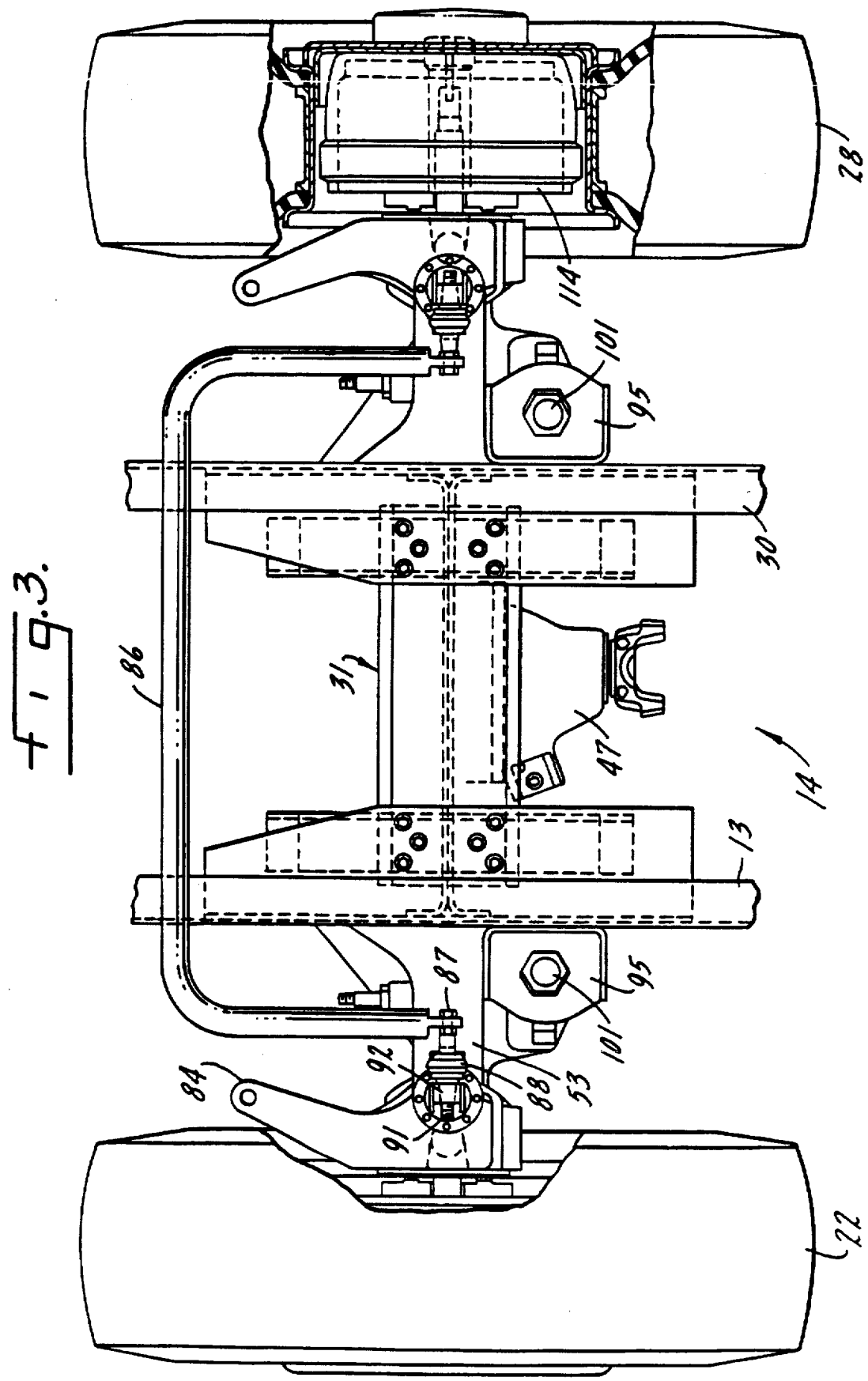
FIG. 3 is a top plan view with parts broken away and others omitted for clarity.
Figure 4:
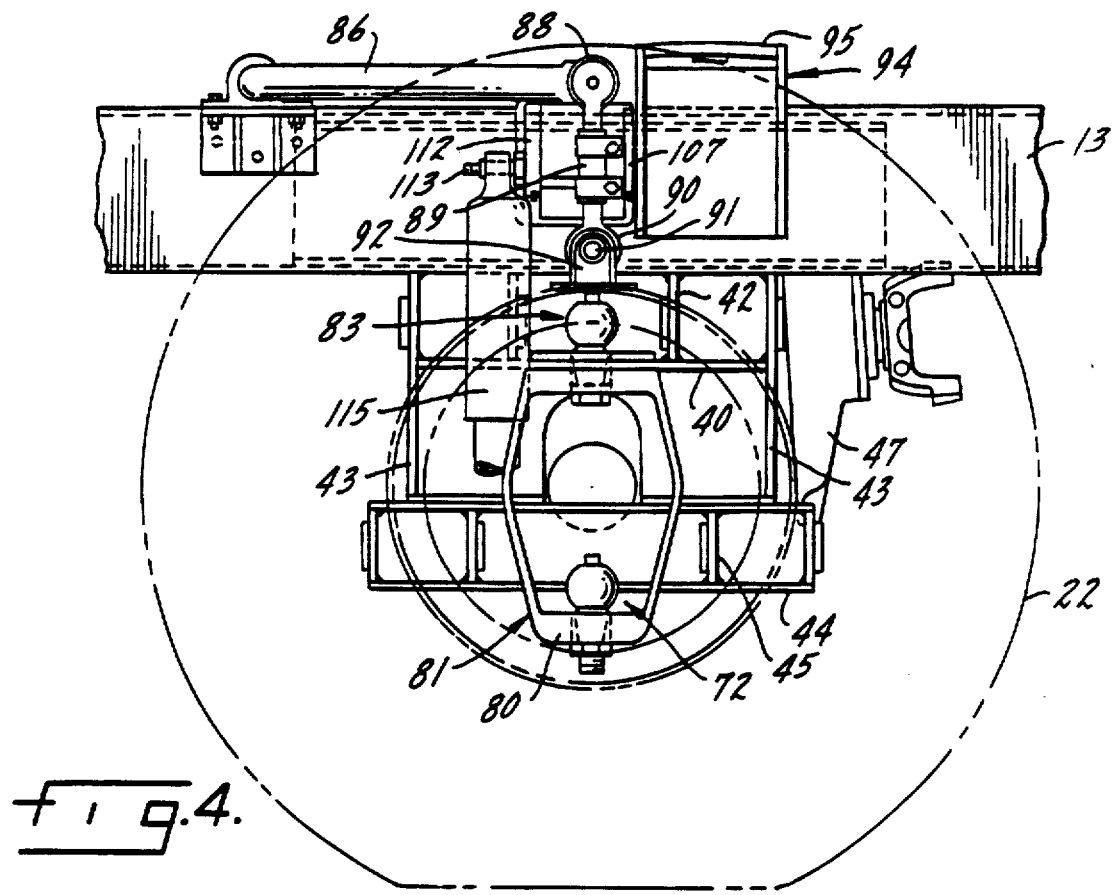
FIG. 4 is a side elevation of the modular independent suspension assembly of this invention with pans broken away, others omitted, and a wheel assembly shown in phantom.

The outer ends of the control arms 50, 56 are secured to a unique universal joint assembly of which lower ball joint 72 will be described as shown in FIGS. 4, 5 and 7. The ball joint consists essentially of only two pieces, a tapered stud 73, and spherical bearing 74. Retention of the stud in the bearing is accomplished by a retaining bolt 75. The purpose in doing this is to make removal of the wheel end simple. By removing the retaining bolt 75 the wheel end can be separated from the suspension control arms without removal of the bearing from the control arm or tapered stud from the steering knuckle. The spherical bearing is retained in projection 58 by a housing 76 and cap screws 77. The tapered stud 73 is retained in the lower arm 80 of a steering knuckle indicated generally at 81. The steering knuckle has an upper arm 82 which receives the tapered stud Or an upper ball joint assembly 83. In this instance a steering arm 84, see also FIG. 3, is clamped to the upper surface of upper arm 82 by the tapered stud, the upper arm 82 and steering arm 84 being proportioned so that the ball joint assembly, including the tapered studs, is interchangeable from the upper to the lower steering knuckle arms.

A sway bar is indicated at 86 in FIGS. 2, 3 and 4, the left end of sway bar 86 being pivotally connected to a shaft 87 whose outer end is received in the upper socket 88 of an extensible and retractable link 89, see FIG. 4, whose bottom socket 90, FIG. 4, is pivotally connected by pin 91 to anchor 92 located at the outer end of stem 53 of the left upper control arm 50, see particularly FIG. 5.

The spring system for the modular independent suspension is illustrated best in FIGS. 2 and 5 and, to a lesser extent, in FIGS. 3 and 4. An upper spring retaining bracket is indicated generally at 94, the bracket being, in effect, a four-sided housing open at the bottom and outside, and being welded or otherwise suitably secured to the outside of left main frame member 13. In this instance the top wall 95, FIG. 3, is located several inches above main frame 13, see FIGS. 4 and 5. A rocker plate 96, see FIG. 2, is pivotally secured to a pivot pin 97, see FIGS. 2 and 5, received in stud 98 which is fast with left lower control arm 56. A long coil spring having a low spring rate is indicated at 99, the lowest coil of the spring being secured to rocker plate 96 and the upper coil being secured to top plate 95. Due to the long wheel travel Or the independent suspension system, the coil spring 99 must be very long and, as seen in the Figures, a coil spring of much greater than normal length is illustrated. The long coil spring, in combination with the necessary small coil diameter, could lead to instability of the spring. As a consequence, a spring guide assembly is provided, the guide assembly comprising a tube or bar 100 which extends downwardly from the top plate 95 and is secured to the top plate 95 by bolt 101. By protruding into the top end of the spring, the length of the coil which is capable of buckling is reduced. This reduces the length-to-width ratio of the coil to a stable configuration.

Preferably the spring guide extension is made from a synthetic, low friction abrasion resistant material. The spring guide assembly stabilizes the inside diameter of the coil without wear, generation of heat/damping, or other adverse effects.

A bump-stop feature is indicated generally at 104 in FIGS. 2 and 5. The bump stop may consist of a rubber cushion 105 which is mounted to a base plate 106 which in turn is secured to one of two triangular struts 107, 112, which in turn are welded or otherwise suitably secured to the main frame members 13 or 30. As best seen in FIG. 5 the bump-stop is positioned to engage the upper control arm 50 early in the upward travel of control arm 50. In addition to serving as a cushioned suspension stop the cushion 105 also acts as a helper spring, augmenting the load carrying capacity of the coil spring 99.

A rebound stop assembly is indicated generally at 108 in FIG. 2. It will be understood that proper design of a coil spring suspension requires that the installed coil never be allowed to extend to a length that would remove its compressive force. When in full, unrestrained rebound, such a suspension would have loose springs which produce a rattle and there would be the danger of the spring slipping out of its installation. Such a result is precluded by the rebound stop assembly 108 which consists of, preferably, a very hard, yet compressible, plastic doughnut or puck-like member 109 which is mounted by support plate 110 to the underside of control arm 52. A stop plate is indicated at 111, the stop plate being aligned with the arc of movement of rebound member 109. In this instance the stop plate is shown as welded or otherwise suitably secured to its associated control arm assembly. By proper placement and positioning of the rebound stop member 109 and the stop plate 111, the extension of coil spring 99 can be controlled during rebound to preclude the coil spring from extending to a length at which its compressive force is neutral, or negative.

As is well known, coil spring suspensions are designed to include a spring preload which requires that the free length of the spring be greater than the room allowed for it in an assembled condition. Conventionally, in such a suspension, a spring compressor is required for assembly. However, compressing the springs for a heavy duty suspension such as that here illustrated is a difficult and dangerous procedure.

Such difficulty and danger is eliminated in the instant system by merely removing the rebound limiter 109. Thereafter a free coil spring may be installed in the suspension, and a floor jack or even the weight of the vehicle used to compress the coil spring enough to install the rebound limiter 109.

Referring now to FIG. 3, it will be noted that drum brakes 114 have been illustrated in the wheel assembly. This is important in that this is the major contributor to the modular independent suspension assembly's narrow width. Given the width of the differential housing, the length of the control arm required for long wheel travel, and the width of a wheel rim and hub, the brake assembly must be a structure which "shares" suspension width with other components, as opposed to adding overall width to the suspension. Drum brakes accomplish this by sharing width with the hub assembly, fitting around it without adding width to it. Further, preferably the drum brake is located around a planetary gear set within the wheel.

Many advantages of the disclosed modular independent suspension will be immediately apparent from the foregoing description. Several of these advantages are especially noteworthy as follows:

If the suspension is employed in a steering axle configuration, the steering arm of the steering knuckle is linked to the steering gear via a tie rod which allows the steering knuckle to be rotated about its ball joints to steer the vehicle.

If the suspension is used in a non-steering axle configuration, the tie rod serves to link the steering arm knuckle to the chassis, thereby maintaining the knuckle in a generally straight-ahead direction. The geometry of the tie rod's attachment points, in both steering and non-steering axles, is such that suspension travel does not generate undesirable steering effects.

Various weight carrying capacities, ride, heights, and deflection rates can be accommodated by installing coil springs of the appropriate length and stiffness, and by positioning the coil spring assembly's mounting point on the chassis accordingly. If desired, a shock absorber 115 with necessary dimensions and desired damping characteristics can be provided. In this instance, the upper end of shock absorber 115 is pivotally connected to triangular strut 112 by a pivot pin 113, see FIG. 5, and the lower end is pivotally connected to the wide plate area 59 on the lower control arm.

Referring now to FIGS. 2 and 5, and assuming that the suspension is used in a driven axle configuration, halfshaft 120 connects the output 116 of the differential to the input 117 of the axle shaft in the wheelend carrier. The half shaft is connected to the output 116 of the differential via a Cardon type universal joint 118. The halfshaft 120 is then connected to the axle shaft in the wheelend carrier by a double-Cardon joint 119. In the case of a non-steering configuration, the double-Cardon could be replaced by a single-Cardon joint.

As consequence, removal of the halfshaft 120 for maintenance and/or replacement can be easily accomplished without disassembly of the suspension. This is done be removing the shaft retaining bolt in the wheelend and the four bolts which mount the single Cardon to the differential output yoke. The shaft is then removed by pulling it out from the suspension, slipper yoke end first.

Wheelend gearing can be used to reduce the torque transmitted by the halfshaft when direct drive is not appropriate.

By the same token, the modular independent suspension permits replacement of the differential without disassembly of wheelends or suspension linkages. This is primarily a result or the control arm bracketry which attaches to the chassis crossmembers as well as the differential housing.

In summary, the modular independent suspension concept heredisclosed constitutes a basic design readily adaptable to almost any vehicle configuration. Further, it allows a high degree of parts commonality among steering, non-steering, driven and non-driven axles on a particular vehicle, and minimizes the additional effort required to incorporate additional axles into a base vehicle design.

Although a specific embodiment and variations thereof have been illustrated and described herein, it will be understood that modifications and betterments of the hereindisclosed concepts may be made within the skill of the art. Accordingly, it is intended that the scope Or the invention be limited solely by the scope of the hereafter appended claims, when interpreted in light of the relevant prior art, and not by the foregoing exemplary description.

We claim:

1. A modular independent suspension for both driven and non-driven axles and both steerable and non-steerable wheels mountable directly to a vehicle chassis supported by said suspension without use of an intermediary sub-frame whereby wheel axle loads imposed on a wheel assembly supported by said suspension are transmitted directly from the wheel assembly to the vehicle chassis, said modular independent suspension including a steering knuckle forming part of a wheel assembly which includes a wheel having a tire, a lower control arm means having an inner end and an outer end, said lower control arm means being pivotally connected for rotation about a lower pivot axis, at its inner end, to a chassis and, at its outer end to a first, lower location on the steering knuckle, an upper control arm means having an inner end and an outer end, said upper control arm means being pivotally connected for rotation about an upper pivot axis, at its inner end, to the chassis and, at its outer end to a second, upper location on the steering knuckle, bracket means integrally formed on the chassis which define, firstly, the upper pivot axis for the upper control arm means and, secondly, the lower pivot axis for the lower control arm means, a single coil spring having an upper end and a lower end, said coil spring being anchored to the chassis at its upper end and, at its lower end being connected directly to the lower control arm means at a location on said lower control arm means which is located inwardly from the connection of said lower control arm means to the steering knuckle, the upper end of the coil spring extending upwardly a distance no greater than approximately the height of the tire, said coil spring being offset from a plane which is perpendicular to the chassis and passes through the connections of the upper and lower control arm means to the steering knuckle to thereby provide clearance for a drive shaft extending outwardly from the chassis, through the steering knuckle, and to the wheel assembly.

2. The modular independent suspension of claim 1 further characterized in that said lower and upper pivot axes are perpendicularly vertically aligned one to the other.

3. The modular independent suspension of claim 2 further characterized in that the length of the lower control arm means is greater than the length of the upper control arm means so that the wheel assembly remains substantially vertical during wheel travel.

4. The modular independent suspension of claim 3 further characterized in that the lower control arm means is articulated to thereby provide high ground clearance.

5. The modular independent suspension of claim 4 further characterized in that said chassis includes a flexible frame.

6. The modular independent suspension of claim 1 further including
- a shock absorber,
- said shock absorber having bracket means for connecting said shock absorber to the chassis at its upper end,
- said shock absorber being pivotally connected to the lower control arm means at its lower end,
- said shock absorber being located on the side of the aforesaid plane opposite to the side on which the coil spring is located.

7. The modular independent suspension of claim 6 further characterized in that
- said lower and upper pivot axes are perpendicularly vertically aligned one to the other.

8. The modular independent suspension of claim 7 further characterized in that
- the length of the lower control arm means is greater than the length of the upper control arm means so that the wheel assembly remains substantially vertical during wheel travel.

9. The modular independent suspension of claim 8 further characterized in that
- the lower control arm means is articulated to thereby provide high ground clearance.

10. The modular independent suspension of claim 9 further characterized in that
- said chassis includes a flexible frame.

11. The modular independent suspension of claim 1 further characterized in that
- the pivotal connection between the inner end of the upper control arm means and the chassis, and the pivotal connection between the inner end of the lower control arm means and the chassis, each includes pivot pin means carried by the chassis and gripping means carried by the upper and lower control arm means, respectively, the pivot pin means being received within the gripping means.

12. The modular independent suspension of claim 11 further characterized in that
- the pivot means which connect the inner ends of the upper and lower control arm means to the chassis each includes a bushing,
- said bushing having metal sleeve means surrounding the pivot pin means associated with each chassis connection,
- said metal sleeve means having an outer periphery and being bonded to a second surrounding metal sleeve means,
- said second metal sleeve means being bonded on its outer periphery to a surrounding flexible annulus,
- said flexible annulus being bonded on its outer periphery to third metal sleeve means, and
- each of said control arm means having a bushing socket which encircles the third metal sleeve means in a rotative relationship therewith.

13. The modular independent suspension of claim 1 further characterized in that
- the connection of each of the outer ends of the upper and lower control arm means to the steering knuckle is a two piece ball joint,
- each of said ball joints having a stud which is secured to the steering knuckle and a ball which is received on the stud, and
- a connectable and disconnectable fastener for securing the ball to the stud,
- whereby, upon removal of the fastener, the steering knuckle and the wheel assembly may be removed from the independent suspension without further disassembly of the suspension.

\* \* \* \* \*